Feb. 20, 1951   R. ABEL ET AL   2,542,446
BALE LOADER
Filed Nov. 29, 1946   2 Sheets-Sheet 1
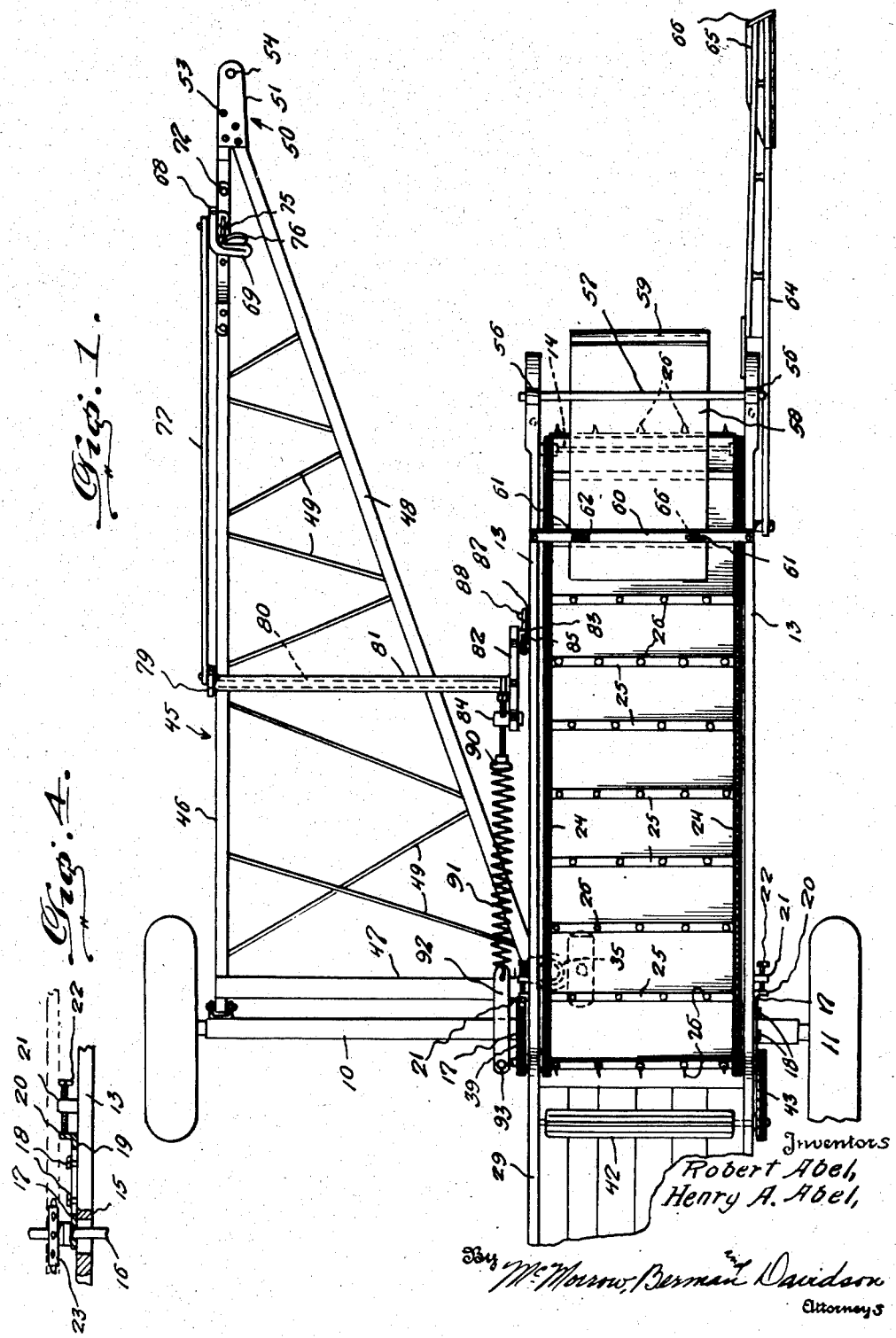
Inventors
Robert Abel,
Henry A. Abel,
By McMorrow, Berman & Davidson
Attorneys

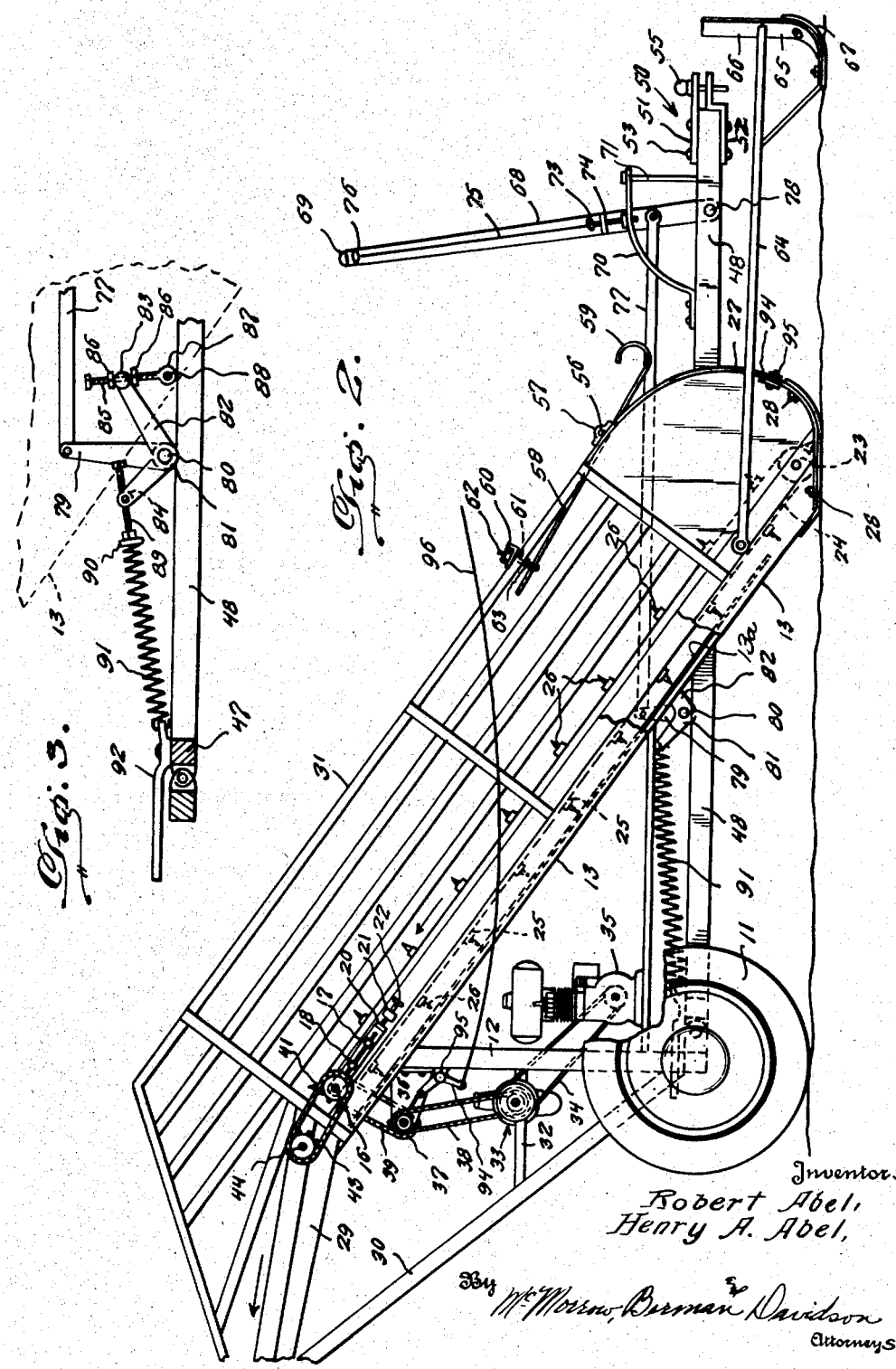

Patented Feb. 20, 1951

2,542,446

UNITED STATES PATENT OFFICE 2,542,446

BALE LOADER

Robert Abel, Coldwater, and Henry A. Abel, Van Wert, Ohio

Application November 29, 1946, Serial No. 712,754

5 Claims. (Cl. 214—42)

My invention relates to bale loaders and more particularly to portable bale loaders.

The object of my invention is to provide a bale loader having its own power plant for driving a conveyor or elevator forming a part of the loader and being adapted to be hitched to a tractor or the like and having a draw bar to permit a wagon, trailer or the like to be hitched onto the loader.

Another object of my invention is to provide a bale loader of the character indicated above, the forward pick-up end of the conveyor whereof is equipped with a guide bar constructed, so that it pulls always to the right and rides automatically over rocks, mounds and the like on the ground, to guide bales, crates or the like inwardly toward the conveyor.

A further object of my invention is to provide a bale loader of the character indicated above, the conveyor assembly whereof is adapted to be secured in lifted position for the purpose of moving the loader, and which can be lowered into pick-up position.

Other objects of my invention not specifically mentioned may appear in the following specification describing my invention with reference to the accompanying drawings illustrating a preferred embodiment of my invention.

It is however to be understood that my invention is not to be limited or restricted to the exact construction and combination of parts described in the specification and shown in the drawings, but that such changes and modifications can be made, which fall within the scope of the claims appended hereto.

In the drawings

Figure 1 is a top plan view of a bale and crate loader according to my invention.

Figure 2 is an elevational side view of the loader.

Figure 3 is a fragmentary elevational side view of the mechanism for arranging the conveyor of the loader in operative and inoperative positions respectively, and Figure 4 is a fragmentary elevational side view, partly shown in section, of the mechanism for adjusting the conveyor of the loader in taut or slack arrangement respectively.

Referring now in detail to the drawings the bale loader forming the subject matter of my invention has an elongated axle 10, on the ends whereof two wheels 11 are rotatably mounted. On the right hand half of the axle two upwardly extending support members 12 are secured, on the upper ends of which the upper portions of the two side frame members 13 of the conveyor are fastened, so that they incline forwardly and downwardly. In the two side frame members 13 and extending between them a conveyor shaft 14 is rotatably arranged adjacent the forward lower ends of the side frame members. In each side frame member 13 a slot 15 is provided and extends longitudinally thereof adjacent its upper end. A second or upper conveyor shaft 16 extends through these slots 15. Outside of each side frame member 13 a bearing slide 17 is slidably secured by means of two bolts 18 extending through a slot 19 in each bearing slide 17 and screwed to the corresponding side member.

The upper conveyor shaft 16 is rotatably supported by these two bearing slides and extends on both sides beyond them. The lower end 20 of each bearing slide 17 is bent outwardly at right angles. At a distance below this bent lower slide end, a lug 21 is arranged on the outside surface of each side frame member 13, and an adjusting screw 22 extends through said lug 21 and the end of this screw is rotatably secured in the bent end 20 of the corresponding bearing slide 17.

On each of the vonveyor shafts 14 and 16, two sprocket gears 23 are rigidly mounted and each of these sprocket gears is arranged adjacent the inner surface of one of the side frame members 13. Over each pair of corresponding sprocket gears 23 a sprocket chain 24 is trained and the links of these chains support transversely extending conveyor members 25, on each of which a plurality of conveyor studs 26 are arranged.

The adjusting screws 22 serve the purpose to move the bearing slides 17, supporting the upper conveyor shaft 16 upwardly or downwardly in relation to the conveyor frame and to regulate thereby the tension of the conveyor chains 24.

Between the two side frame members 13 a chaff plate 13a is arranged and secured to them so that it is located under the lower flights of the conveyor chains 24, adjacent and parallel to the lower edges of said side frame members. This chaff plate is preferably made from light weight sheet metal and extends to approximately one foot from the bottom end of the conveyor so that dirt and chaff from the loaded hay or the like will fall onto this plate and slide back onto the ground and is not loaded onto the wagon or trailer.

The forward end of each side frame member 13 is beveled rearwardly and onto each beveled end a forwardly and upwardly curved base shoe 27 is removably attached, for instance by bolts 28. These shoes serve the purpose of protecting the conveyor side frame members against wear caused by sliding over the ground.

On the upper ends of the conveyor side frames 13, a rearwardly extending platform 29 is fastened, which is supported further by a pair of struts 30 fastened to and extending upwardly and rearwardly from the lower ends of the two upright supports 12.

A guide rail 31 is secured on each conveyor side frame member 13 and extends rearwardly alongside the platform 29.

A horizontal support 32 extends between one of the vertical supports 12 and the corresponding strut 30 and supports a gear transmission 33 actuated by means of a belt 34 by a motor 35 arranged on a support fastened to the uprights 12.

A bracket 36 is secured to one of these uprights 12 adjacent its upper end, and a clutch 37 is supported by said bracket. The driving part of this clutch is actuated by means of a chain 38 extending between the clutch 37 and the gear transmission 33.

A second chain 39 is trained over the driven gear of the clutch 37 and a sprocket gear 40 on the upper conveyor shaft 16, so that the conveyor is actuated by the motor 35.

On the other end of the upper conveyor shaft 16 another sprocket gear 41 is rigidly mounted.

A bale transfer 42, consisting of a roller on which a plurality of longitudinal slats are secured so that they extend radially outwardly to said roller, is arranged transversely to the platform 29 adjacent the upper end of the conveyor. The bale transfer 42 is journaled in the guard rail of the platform and is driven by a sprocket chain 43 trained over the sprocket gear 41 on the upper conveyor shaft 16 and another sprocket gear 44 rigidly mounted on one of the journals of the bale transfer 42.

To the left hand half of the axle 10, a substantially triangular hitch frame 45 is hingedly attached. The left hand side member 46 of this triangular hitch frame extends at right angles to the axle 10 and forwardly therefrom and the short base member 47 of the frame extends parallel to the said axle, while the third side member 48 of the hitch frame extends forwardly and outwardly from the inner end of the short base member 47. Between the left hand side member 46 of the hitch frame 45 and the third side member 48 thereof a plurality of struts 49 are arranged to reinforce said frame and the forward ends of the said two frame members are connected with each other by means of a tractor hitch 50 consisting of a top plate 51 and a bottom plate 52, secured to the said hitch frame members by rivets 53. The two hitch plates 51 and 52 are each provided adjacent their forward ends with a hole 54, and these two holes are arranged coaxially with each other, so that a hitch pin 55 can be inserted therethrough.

On the upper end of each base shoe 27 a bearing 56 is arranged and a round bar 57 is rotatably supported by these bearings and extends transversely of the conveyor. To the under side of the bar 57 a bumper plate 58 is firmly secured, and the lower end 59 of this plate is curved upwardly. An angle iron 60 is fastened to the uppermost members of the guide rails 31 of the conveyor, and extends transversely of the conveyor over the rear portion of the bumper plate 58.

Two screw studs 61 extend upwardly from this plate through enlarged holes provided in the angle iron 60, and a wing nut 62 on each screw stud 61 secures the studs in these holes. A helical spring 63 surrounds each screw stud 61 and abuts the bumper plate 58 with one of its ends and the angle iron 60 with its other end.

On the right hand conveyor frame member 13 a forwardly extending guide shoe support 64 is pivotally mounted carrying on its forward end an upwardly curved guide shoe 65, the forward end 66 of which is arranged to extend forwardly and outwardly therefrom. An exchangeable base shoe 67 is removably attached to the bottom portion of the guide shoe 65.

When the loader described above is hitched to a tractor or the like (not shown), it can be moved over a field to pick up baled hay or the like. The guide shoe 65 will move bales or the like into position in front of the conveyor, and the bumper plate upsets any bales, which stand upright. The conveyor, actuated by the motor 35, picks the bales up and conveys them upwardly, where they are lifted from the conveyor by the bale transfer 42 and pushed onto the platform 29.

When the bale loader is to be moved from one field to another the front end of the conveyor, which rests on the ground while the loader works, is lifted from the ground by the following mechanism:

A hand lever 68, having a laterally extending handle 69, is pivotally mounted on the outside of the left hand side member 46 of the hitch frame 45 adjacent the forward end thereof. A locking bracket 70 is fastened on top this hitch frame side member and curves upwardly therefrom. The upper forward end of said bracket is secured to the right hand side member of the hitch frame by a bolt 71 and is provided with two locking holes 72. A spring biased locking pin 73 extends through a lateral lug 74 on the hand lever 68 and is urged by the spring to engage one or the other of the holes 72. The pin 73 can be disengaged from the locking hole by a pull rod 75 fastened on its upper end to a handle 76 located under the handle 69 of the hand lever 68.

A rearwardly extending connecting bar 77 is pivotally attached to the hand lever 68 at a distance above its pivot pin 78 connecting it with the hitch frame member 46. To the rear end of the connecting bar 77 a downwardly extending lever arm 79 is pivotally connected, which is rigidly mounted on the outer end of a transverse adjusting shaft 80. This shaft is rotatably arranged in and extends through a tubular member 81, which is arranged transversely to the hitch frame 45, is securely fastened on top of the hitch frame members 46 and 48 and extends beyond the last named member.

A bell crank 82 is rigidly mounted on the right hand end of the adjusting shaft 80 and has an inwardly extending lug 83 rotatably mounted in its forwardly extending arm and an outwardly extending lug 84 rotatably mounted in its rearward arm.

An adjusting screw 85 extends through a hole in the lug 83 on the forward bell crank arm and has two adjusting nuts 86 thereon, one above and the other below the lug 83. On the lower end of the adjusting screw 85 an eye 87 is formed, and a pin 88 on the adjacent conveyor side frame member 13 extends rotatably through said eye.

Another adjusting screw 89 engages a threaded hole provided in the outward lug 84 on the rearward bell crank arm. The rear end of the second adjusting screw 89 is rotatably secured in a head 90 secured to the forward end of a helical spring 91. The rear end of this spring is fastened to the forward end of a wagon hitch bar 92 secured on top of the short hitch frame member 47 adjacent its inner end. This hitch bar 92 is provided in its rear end with a hole 93, to which a wagon, trailer or the like can be hitched.

The clutch 37 is adapted to be operated by means of a crank lever 94 pivotally supported by a bracket 95 on the upright 12. The crank lever 94 is operated by a cord 96 extending forwardly to the tractor (not shown).

By moving the hand lever 68 rearwardly the bell crank 82 is pivoted, so that the conveyor is lifted from the ground. The hand lever 68 is secured in this position by the lock pin 73 engaging the rear lock hole 72 in the lock bracket 70.

To lift the guide shoe 65 and its support 64 with the conveyor a stop block 94 is adjustably fastened to the right hand frame member 13 by bolts 95 extending through slots in the block 94.

Having described our invention we claim as new and desire to secure by Letters Patent:

1. A bale loader comprising an elongated axle, wheels rotatably mounted one on each end of said axle, two upright supports mounted at their lower ends on one half of said axle, a conveyor unit supported at one end on said upright supports with its other end in sliding engagement with the ground, said conveyor unit including a pair of frame side members the end of which at said other end of the conveyor unit are curved upwardly, glide shoes attached one to each frame side member at the upwardly curved end thereof, a guide shoe support attached at one end to one of said frame side members near the upwardly curved end of the latter for pivotal movement in a substantially vertical direction and extending from said other end of said conveyor unit, and a guide shoe mounted on the other end of said guide shoe support.

2. A bale loader comprising an elongated axle, wheels journaled one on each end of said axle, upright supports mounted at their lower ends on one half of said axle, a conveyor unit supported at one end on said upright supports with its other end in sliding engagement with the ground, said conveyor unit including a pair of frame side members the ends of which at said other end of the conveyor unit are upwardly curved, glide shoes removably attached one to each of said frame side members at the upwardly curved end thereof, a bumper plate disposed between and pivotally secured to said frame side members and having an upwardly curved end adjacent the upwardly curved ends of said frame side members, a stop member extending between and secured to said frame side members above the other end of said bumper plate, and a plurality of resilient spacers disposed between said stop member and said bumper plate to resiliently stop the pivotal movements of said bumper plate in one direction.

3. A bale loader including an elongated axle, a wheel rotatably mounted on each end of the axle, two upright supports on one half of the axle, and a conveyor unit, the rear end whereof is secured to and rests on the upright supports and forward end whereof is adapted to slide over the ground, a tractor hitch frame hingedly connected with the other half of the axle, said frame being right-angled triangular, the apex of said frame extending forwardly, and a tractor hitch secured to the apex of the tractor hitch frame, an adjusting hand lever pivotally mounted on the outside member of the hitch frame, an adjusting shaft rotatably mounted on and extending over the hitch frame, a lever arm on the outside end of the adjusting shaft, a connecting bar pivotally connected with the lever arm and the hand lever, a bell crank lever rigidly mounted on the inner end of the adjusting shaft, the forward arm of the bell crank being pivotally and adjustably connected with the left hand side frame member, a wagon hitch bar secured to the rear member of the hitch frame, a forwardly extending helical spring secured to the hitch bar, a swivel head secured to the forward end of the spring, an adjusting screw rotatably connected with the swivel head, and adjustably and pivotally connected with the rear arm of the bell crank.

4. A bale loader including an elongated axle, a wheel rotatably mounted on each end of the axle, two upright supports on the right hand half of the axle, and a conveyor unit, the rear end whereof is secured to and rests on the upright supports and forward end whereof is adapted to slide over the ground, a tractor hitch frame hingedly connected with the left hand half of the axle, said frame being right-angled triangular, the apex of said frame extending forwardly, and a tractor hitch secured to the apex of the tractor hitch frame, an adjusting hand lever pivotally mounted on the outside member of the hitch frame, an adjusting shaft rotatably mounted on and extending over the hitch frame, a lever arm on the outside end of the adjusting shaft, a connecting bar pivotally connected with the lever arm and the hand lever, a bell crank lever rigidly mounted on the inner end of the adjusting shaft, the forward arm of the bell crank being pivotally and adjustably connected with the left hand side frame member, a wagon hitch bar secured to the rear member of the hitch frame, a forwardly extending helical spring secured to the hitch bar, a swivel head secured to the forward end of the spring, an adjusting screw rotatably connected with the swivel head, and adjustably and pivotally connected with the rear arm of the bell crank, and spring biased locking means for securing the hand lever in adjusted position.

5. A bale loader comprising an axle, wheels journaled on said axle one at each end thereof, supports extending upwardly from said axle and disposed between the mid-length location and one end of the latter, a belt conveyor unit secured at one end to the upper ends of said supports and inclined forwardly and downwardly therefrom, said conveyor unit including spaced apart side frame members each upwardly curved at its end remote from said supports, a glide shoe on the upwardly curved end of each side frame member, a guide shoe support pivotally attached at one end to one of said side frame members near the forwardly and upwardly curved end of the latter and extending forwardly of said side frame member for swinging movement in a substantially vertical plane, and a guide shoe carried by said guide shoe support at the end of the latter remote from said side frame member for guiding bales onto said conveyor.

ROBERT ABEL.
HENRY A. ABEL.

REFERENCES CITED

The following references are of record in the file of this patent:

UNITED STATES PATENTS

| Number | Name | Date |
|---|---|---|
| 930,719 | Battee | Aug. 10, 1909 |
| 1,022,214 | Weeks | Apr. 2, 1912 |
| 1,707,725 | Jantz | Apr. 2, 1929 |
| 2,256,830 | Johnson | Sept. 23, 1941 |
| 2,316,435 | James | Apr. 13, 1943 |
| 2,327,494 | Brown | Aug. 24, 1943 |
| 2,334,304 | Arnett et al. | Nov. 16, 1943 |
| 2,397,570 | Smoker | Apr. 2, 1946 |
| 2,404,629 | Griff | July 23, 1946 |